UNITED STATES PATENT OFFICE.

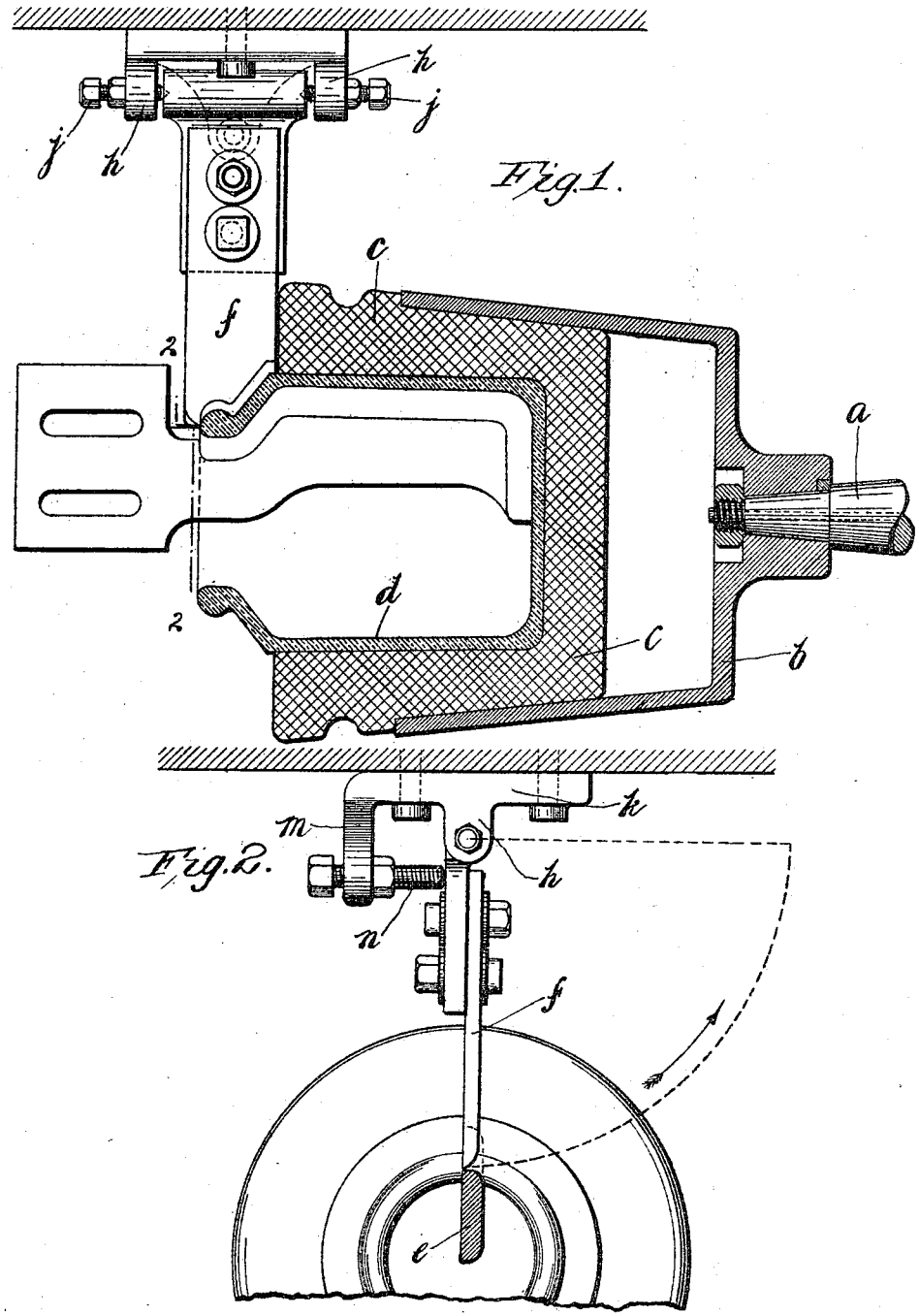

HENRY OAKES, OF TAMWORTH, ENGLAND, ASSIGNOR TO GEORGE SKEY AND COMPANY LIMITED, OF TAMWORTH, ENGLAND.

APPARATUS FOR THE MANUFACTURE OF EARTHENWARE VESSELS.

1,230,017. Specification of Letters Patent. Patented June 12, 1917.

Application filed November 29, 1916. Serial No. 134,125.

*To all whom it may concern:*

Be it known that I, HENRY OAKES, subject of the King of Great Britain, residing at Cliff Villas, Victoria Road, Tamworth, Staffordshire, England, assistant chemist, have invented certain new and useful Improvements in Apparatus for the Manufacture of Earthenware Vessels, of which the following is a specification.

This invention relates to the manufacture of jars, pots, and other vessels of earthenware and has for its object the molding or formation of the upper part of the vessel by means of an external knife or tool in conjunction with an inner knife.

In forming a jar or like vessel by machine, it is most common particularly with larger vessels to employ a mold rotating in a chuck or other device on a spindle into which mold a ball or body of clay is placed, and an internal knife or tool, mounted slightly eccentrically to the mold actuating spindle (*i. e.*, the work spindle) enters the clay and shapes out the interior, as the mold rotates; the exterior takes the form of the mold or is formed by hand or shaped at a later operation.

In this invention only a portion of the body is contained within the mold or holding part, and the remainder is shaped between the coöperating edges of one or more internal knives and one or more external knives, the outer knife or knives for this purpose being in place during the complete molding or shaping operation. By shaping the coöperating edges of the internal and external knives the neck and upper part can be formed outside the mold and in the case of smaller vessels the greater part of the body or even the whole of it can be shaped between the knives. The term knife is used to include any blade or shaping edge against which the clay is rotated.

On the drawing:

Figure 1 is a sectional elevation showing the known mold spindle with its chuck and the mold in position and shows the improved knives in operating position with respect to the work.

Fig. 2 is a sectional end view on line 2—2 of Fig. 1 broken away for convenience of illustration.

On these drawings *a* indicates any suitable known rotary spindle which will be driven at suitable speeds, *b* is the known chuck or mold holder on and rotating with the spindle, *c* indicates a suitable known form of mold and *d* is the work in place therein.

The internal knife which shapes out the interior of the work is shown at *e* but it will be understood that any suitable internal knife having a shaped edge or profile adapted to coöperate with the external knife for the purpose required may be used without departing from the invention. Such internal knives working the mass of clay within a mold such as *c* are well known in the art and no further description of its arrangement is necessary.

As clearly seen a portion of the work projects from the mold and this is operated upon by a knife or tool *f* having its operative surface shaped as desired for example in a manner adapted to form the exterior of the neck or upper part of the vessel or urn. The internal knife or tool *e* is suitably shaped to work the inner contour of this part of the vessel and in combination with the external knife this part of the body is molded and may be given any shape desired and with a rim or lip around the mouth as shown at *g*.

The external knife *f* is preferably radial to the work spindle and is hinged so that it can be brought up to operative position, after the clay is in the chuck or carrier, and moved aside in the direction of the arrow in Fig. 2 to enable the finished work to be removed.

It is preferred to mount the knife holder between lugs *h* on adjustable centers, formed for example by a pair of adjustable set pins *j* which can be locked in any adjustable position by a lock nut on the shank working against the face of the lug.

The bracket *k* on which the lugs are formed for hinging the knife also carries a lug *m* at right angles to the others through which a screw with lock nut is arranged to form an adjustable stop *n* for the knife in the operative position. (See Fig. 2.)

It will be understood that any desired shape may be given to the working edge of the knife or tool *f* according to the external shape desired for the vessel. Also the extent of the knife longitudinally of the vessel may be varied according to the amount of surface it is desired to operate on.

I claim:

1. In a machine of the character described, the combination of a mold holder with a mold therein and external and internal knives adapted to form the outside and the inner face of a work piece in said mold respectively, and means for hingedly suspending the externally working knife, substantially as described.

2. In a machine of the character described, the combination of a mold holder with a mold therein and coöperating knives working on the outer and inner faces of a work-piece within said mold, and a bracket, lugs on said bracket between which the externally operating knife is adjustably and hingedly secured, and a lug on said bracket at right angles to said first named lugs and an adjustable stop in said lug for limiting the operation of the hingedly suspended knife, substantially as described.

In testimony whereof I affix my signature in presence of two witnesses.

HENRY OAKES.

Witnesses:
F. GILBERT BRETTELL,
C. F. H. WHITEHOUSE.

Copies of this patent may be obtained for five cents each, by addressing the "Commissioner of Patents, Washington, D. C."